US008141839B2

(12) United States Patent
Buchner

(10) Patent No.: US 8,141,839 B2
(45) Date of Patent: Mar. 27, 2012

(54) POLE MOUNTING DEVICE

(76) Inventor: Michael R. Buchner, Loveland, CO (US)

( * ) Notice: Subject to any disclaimer, the term of this patent is extended or adjusted under 35 U.S.C. 154(b) by 402 days.

(21) Appl. No.: 12/416,301

(22) Filed: Apr. 1, 2009

(65) Prior Publication Data

US 2010/0252711 A1 Oct. 7, 2010

(51) Int. Cl.
*F16M 13/00* (2006.01)

(52) U.S. Cl. .... 248/516; 248/514; 248/533; 248/229.15

(58) Field of Classification Search .................. 248/514, 248/516, 540, 538, 288.51, 229.15, 515; 43/21.2; 116/173; D22/147
See application file for complete search history.

(56) References Cited

U.S. PATENT DOCUMENTS 3,792 A * 10/1844 Heermance ........................ 5/152
110,434 A 12/1870 Clark
230,521 A 7/1880 Barker
601,523 A * 3/1898 Orchard ................... 248/229.15
840,241 A 1/1907 Nootbaar
877,802 A 1/1908 Shuster
2,540,584 A 2/1951 Jaycox
2,548,351 A * 4/1951 Coombs ........................ 248/516
2,556,206 A * 6/1951 Militano ....................... 248/515
2,692,106 A 10/1954 Herrmann
3,290,816 A 12/1966 Eklof
3,424,419 A 1/1969 Siegel
3,540,406 A 11/1970 Dexter
3,540,685 A 11/1970 Gualano
3,762,360 A 10/1973 Hawes
3,941,340 A 3/1976 Rankins
3,952,981 A 4/1976 Acker
4,850,564 A * 7/1989 Padin ............................ 248/533
5,054,737 A 10/1991 DeLancey
5,299,773 A 4/1994 Bertrand
5,374,024 A 12/1994 Williams
5,431,364 A * 7/1995 Etter ............................. 248/514
5,483,916 A 1/1996 Kolvites et al.
5,761,844 A 6/1998 Horschel
5,836,327 A * 11/1998 Davis .............................. 135/16
5,845,885 A 12/1998 Carnevali
5,899,167 A 5/1999 Furman
6,484,987 B2 11/2002 Weaver
7,013,823 B1 3/2006 Daugherty
D564,062 S 3/2008 Carnevali

* cited by examiner

*Primary Examiner* — Gwendolyn Baxter
(74) *Attorney, Agent, or Firm* — Ancel W. Lewis, Jr.

(57) ABSTRACT

A pole mounting device has a rod with a ball at one end and a clamp at the opposite end, and a holder tube with a ball socket that forms a ball joint with the ball on the end of the rod. The holder tube rotates relative to the rod about two transverse axes. A pole is held in one end of the tube and a set screw in the other end adjusts rotational resistance of the ball joint. The mounting device can mount flag poles, and with an adapter, mobile electronic devices or other articles.

16 Claims, 4 Drawing Sheets

POLE MOUNTING DEVICE

TECHNICAL FIELD

The present invention relates to mounting devices for poles, and more particularly to a pole mounting device that allows rotation of a pole around two axes with adjustable resistance.

BACKGROUND ART

Regulations in many states require the raising of a warning flag when a water skier is down in the water in the vicinity of the tow vessel. Often a spotter manually holds the flag. Holding the flag can limit the ability of the spotter to aid the skier or do other tasks.

Some prior known flag holders are rigid, holding the flag pole in a single position, and mount substantially permanently on a tow vessel. The flag must be removed and stowed when the skier skis or is back in the boat, and the flag must be found and inserted when the skier is in the water, with this type of flag holder.

Other prior known flag holders rotate about a single axis. Generally these flag holders must be mounted on a vertical surface, limiting the possible mounting locations. Possible obstruction by boat structures further limits the mounting positions of these flag holders.

Mounting a mobile electronic device on a structure or vehicle, such as a boat or golf cart, provides convenient access to the electronic device. In order to optimize viewing of the display on the electronic device, the electronic device should be rotatable about multiple axes. The electronic device and the mounting device should both be easily moved or removed.

DISCLOSURE OF THE INVENTION

A pole mounting device includes a holder portion, a support portion, and a clamp. The holder portion is generally tubular and hollow with an interior surface. A part of the interior surface at one end of the holder portion is shaped to form a pole cavity sized to receive the lower end of a pole. A part of the interior surface at the other end of the holder portion is shaped to form a ball socket. A side window extends through the holder portion into the ball socket. The support portion has an elongated cylindrical rod and a ball with a larger diameter than the rod section attached to one end of the rod. The ball is sized to fit into the ball socket to form a ball joint, with the rod extending outwardly through the window. A means for adjusting the holding force of the ball joint connects to the holder portion. The clamp attaches to the rod opposite the ball. The ball joint allows the holder portion to rotate relative to the support portion about a first axis through the center of the rod and about a second axis transverse to the first axis. An adapter with a short pole permits mounting of mobile electronic devices.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
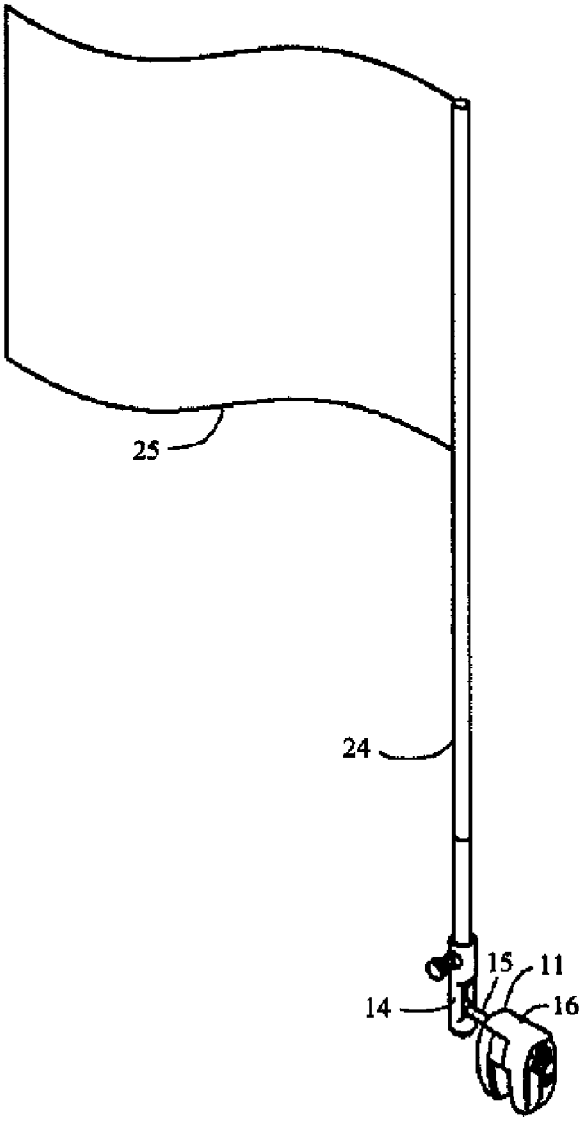
FIG. 1 is a perspective view of a pole mounting device embodying features of the present invention, with a flag on a flag pole.
Figure 2:
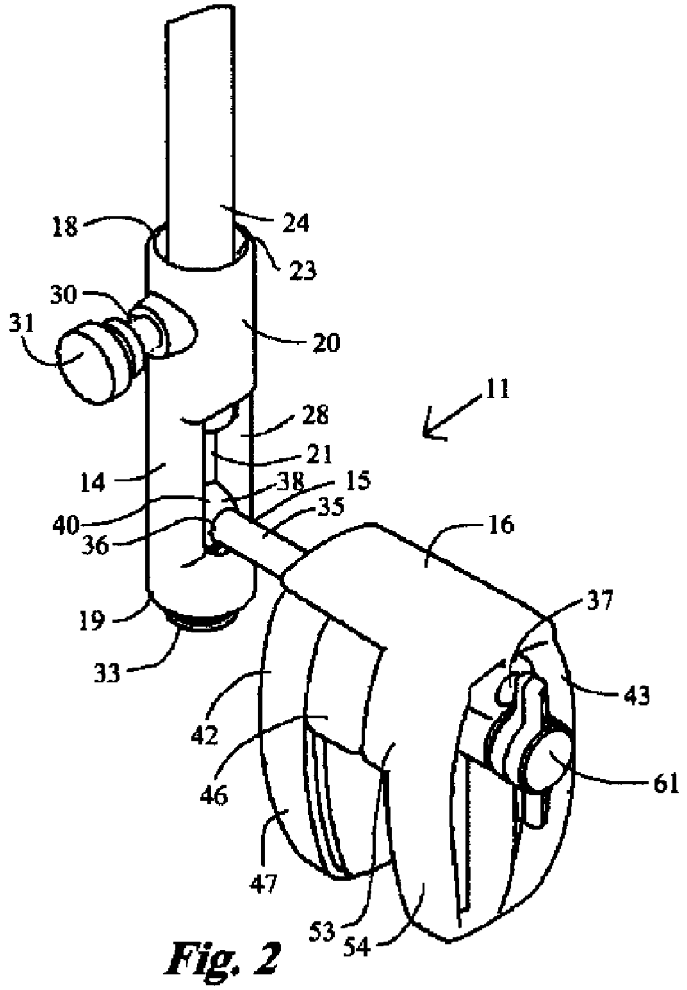
FIG. 2 is an enlarged perspective view of the mounting device of FIG. 1.
Figure 3:
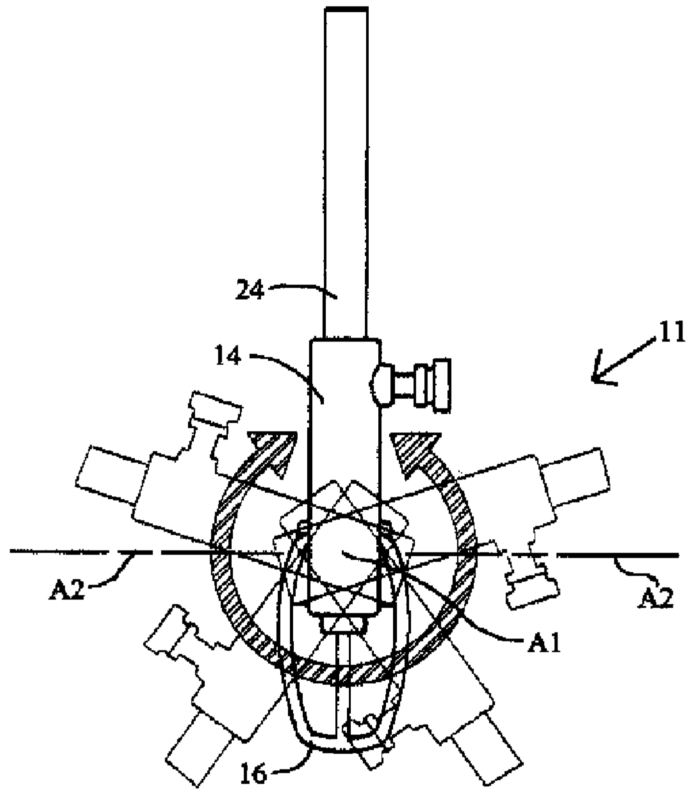
FIG. 3 is a side elevation view of the mounting device of FIG. 1.

Referring now to FIGS. 1-6, a pole mounting device 11 embodying features of the present invention includes a holder portion 14, a support portion 15 and a clamp 16. The holder portion 14 is generally tubular and hollow, and is shown as substantially cylindrical. By way of example, and not as a limitation, pole mounting device 11 is shown in FIG. 1 holding a flag pole 24 with a flag 25.

Describing the specific embodiments herein chosen for illustrating the invention, certain terminology is used which will be recognized as being employed for convenience and having no limiting significance. For example, the terms "front", "back", "up", and "down" will refer to the illustrated embodiment in its normal position of use. The terms "inward" and "outward" will refer to the direction relative to the center of the element being described. Further, all of the terminology above-defined includes derivatives of the word specifically mentioned and words of similar import.

The holder portion 14 has an open, upper first end 18, a spaced, open, lower second end 19, an exterior surface 20 extending between the first and second ends 18 and 19, and a spaced, interior surface 21 extending between the first and second ends 18 and 19. The upper section of the interior surface 21 is shaped to define a pole cavity 23 that extends downwardly from the first end 18 and is sized to receive the end of the flag pole 24 opposite the flag 25. The interior surface 21 is shaped to form a ball socket 27 that is spaced upwardly from the second end 19. The interior surface 21 is internally threaded from the second end 19 to the ball socket 27.

A window 28 extends through the holder portion 14 from the exterior surface 20 to the interior surface 21. The window 28 extends vertically from the lower extent of the ball socket 27 upwardly past the middle of the holder portion 14. An internally threaded screw aperture 30 is spaced downwardly from the first end 18 and extends from the exterior surface 20 into the pole cavity 23. A pole screw 31 is threaded into the screw aperture 30 to press against the flag pole 24 and secure the flag pole 24 in the pole cavity 23. A set screw 33 is sized and shaped to thread into the second end 19.

The support portion 15 includes an elongated cylindrical rod 35 with a first end 36 and a spaced second end 37, and a ball 38 rigidly attached to the first end 36 of the rod 35. The rod 35 is sized to fit through the window 28 of the holder portion 14. The ball 38 is sized to fit into the ball socket 27 of the holder portion 14. The ball 38 and ball socket 27 form a ball joint 40, with the rod 35 extending transverse to the holder portion 14.

The support portion 15 is assembled to the holder portion 14 by inserting the second end 37 of the rod 35 at an angle into the second end 19 of the holder portion 14 and out through the window 28 of the holder portion 14, and pulling the rod 35 through the window 28 until the ball 38 seats in the ball socket 27. The vertical height of the window 28 in the holder 14 above the ball socket 27 is selected in part to accommodate insertion of the rod 35 of the selected length. The set screw 33 is threaded into the second end 19 of the holder portion 14 and presses the ball 38 into the ball socket 27, acting as a means for adjusting the rotational resistance of the ball joint 40. This mean for adjusting the rotational resistance allows the holder portion 14 to be moved to different positions relative to the clamp 16 and remain in the new position without loosening and tightening any screws or bolts and the like.

Preferably the set screw 33 is made of a nylon or plastic material. If the set screw 33 is steel, the ball joint 40 can be locked at any desired position. Other means for adjusting the rotational resistance of the ball joint 40 can be used. The ball joint 40 allows the holder portion 14 to rotate relative to the support portion 15 through an unlimited range of rotation about a first axis A1 that extends through the center of rod 35, and to rotate about a second axis A2 that extends through the center of ball 38, transverse to the first axis A1 and transverse to the direction the flag pole 24 extends from the holder portion 14. The vertical height of the window 28 and the position of the window 28 relative to the ball socket 27 are selected to limit the range of rotation about the second axis A2 of the holder portion 14 relative to the support portion 15. The ball joint 40 shown allows the first end 18 of the holder portion 14 to rotate about the second axis A2 about 45 degrees towards the support portion 15 and about 25 degrees away from the support portion 15, for a range of rotation of about 70 degrees.

Figure 4:
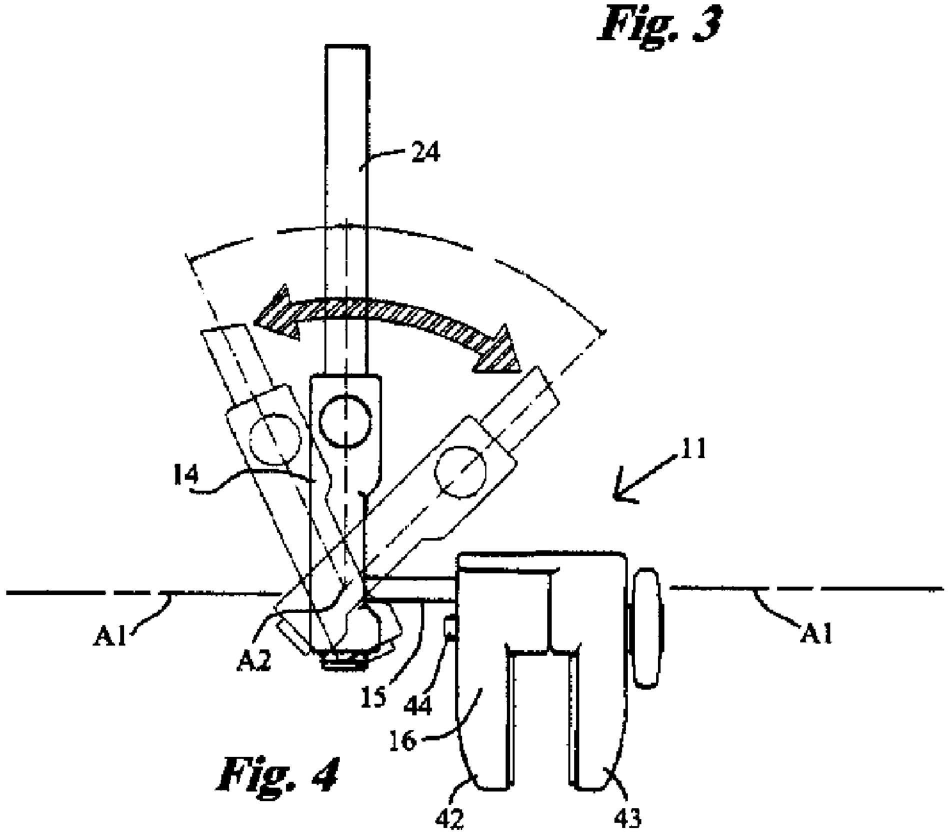
FIG. 4 is a front elevation view of the mounting device of FIG. 1.
Figure 5:
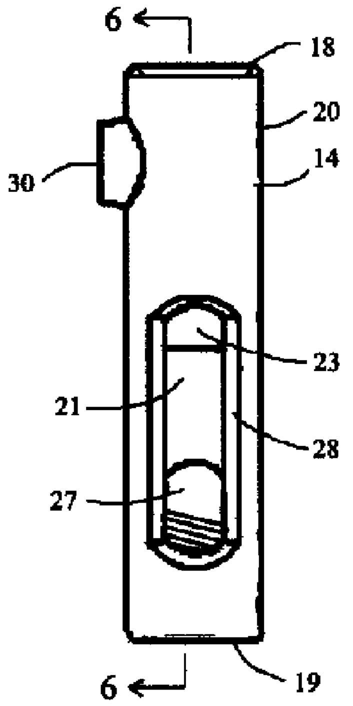
FIG. 5 is a side elevation view of the holder portion of the mounting device of FIG. 1.
Figure 6:
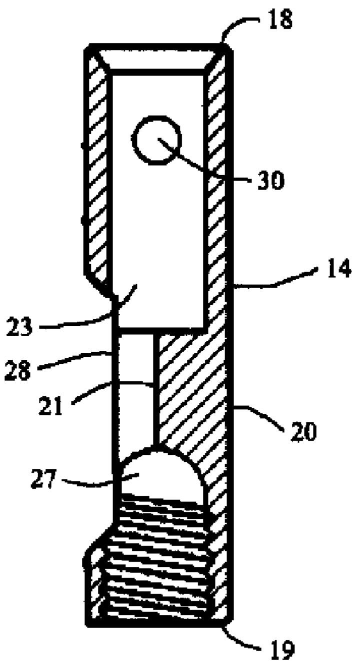
FIG. 6 is a sectional view of the holder portion of the mounting device of FIG. 1, taken along line 6-6 of FIG. 5.
Figure 7:
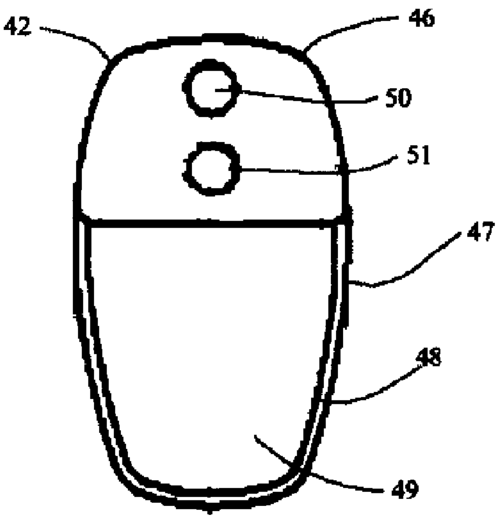
FIG. 7 is an inner side elevation view of the first clamp portion of the clamp of the mounting device of FIG. 1.
Figure 8:
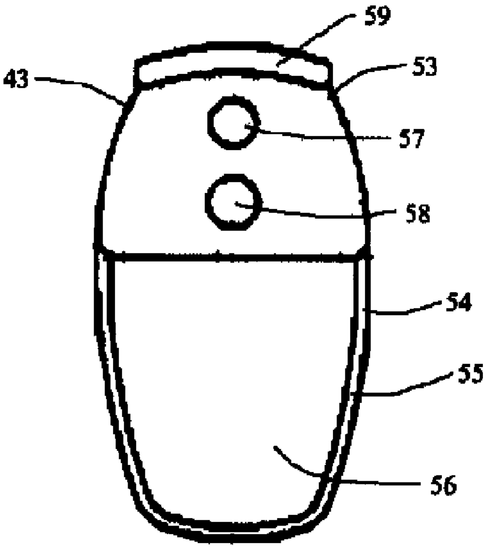
FIG. 8 is an inner side elevation view of the second clamp portion of the clamp of the mounting device of FIG. 1.

As shown in FIGS. 4, 7 and 8, the clamp 16 is generally a vise clamp and includes a first portion 42, a second portion 43 and a bolt 44. The first portion 42 has a body 46 and a jaw 47 that projects downwardly from the body 46. The jaw 47 has a substantially flat, inwardly facing jaw surface 48 that is stepped outwardly from the body 46. A resilient pad 49 covers the jaw surface 48. A rod aperture 50 extends through the body 46, and is sized to slidingly receive the rod 35. An internally threaded bolt aperture 51 extends through the body 46, spaced below and parallel to the rod aperture 50. The bolt 44 is sized to thread into the bolt aperture 51.

The second portion 43 has a body 53 and a jaw 54 that projects downwardly from the body 53. The jaw 54 has a substantially flat, inwardly facing jaw surface 55 that is stepped outwardly from the body 53. A resilient pad 56 covers the jaw surface 55. A rod aperture 57 extends through the body 53, and is sized to receive and rigidly attach to the second end 37 of the rod 35. A bolt aperture 58 extends through the body 53, spaced below and parallel to the rod aperture 57. The bolt aperture 58 is sized to slidingly receive the bolt 44. A guide section 59 projects inwardly from the top of the body 53 and is shaped to extend slidingly over the top of the body 46 of the first portion 42. A wing knob 61 attaches to the head of the bolt 44.

The clamp 16 is assembled with the jaw surfaces 48 and 55 of the first and second portions 42 and 43 facing each other. The rod 35 extends through the rod aperture 50 of the first portion 42 and the second end 37 is rigidly attached in the rod aperture 57 of the second portion 43. The bolt 44 extends through the bolt aperture 58 of the second portion 43 and threads into the bolt aperture 51 of the first portion 42. The clamp 16 is positioned with the jaw surfaces 48 and 55 of the first and second portions 42 and 43 on opposite sides of a structure and the bolt 44 is tightened to attach the clamp 16 to the structure. The pads 49 and 56 of the first and second portions 42 and 43 conform to the structure, allowing the clamp 16 to clamp to many contours without scratching or damage.

The clamp 16 permits the pole mounting device 11 to removably attach to rails, windows or other structure on a boat and is a means for removably attaching the support portion 15 to a structure. The support portion 15 provides cantilevered support for the holder portion 14, spacing the holder portion 14 away from the structure to which the clamp 16 is attached. The holder portion 14 is rotated about the first axis A1 through about a 180 degree arc to raise or lower the flag 25. The ball joint 40 allows the holder portion 14 to rotate about the second axis A2 to compensate for attaching the pole mounting device 11 to angled structure and to allow maneuvering around obstacles, such as internal features of the boat, when raising or lowering the flag 25. The set screw 33 can be selectively tightened to adjust the rotational resistance.

Figure 9:
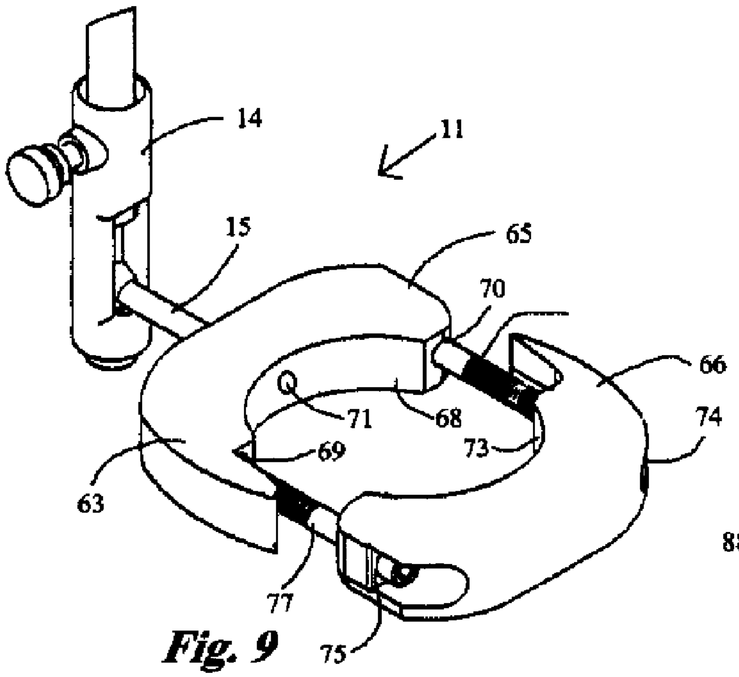
FIG. 9 is perspective view of the mounting device of FIG. 1 with an alternative clamp.

FIG. 9 shows the pole mounting device 11 with an alternative clamp 63. The clamp 63 is generally ring shaped with opposed, complementary semi-circular first and second portions 65 and 66. The first portion 65 has a semi-cylindrical inner surface 68, an internally threaded first bolt aperture 69 at one end, a spaced, smooth second bolt aperture 70 at the opposite end, and a rod aperture 71 intermediate the first and second bolt apertures 69 and 70. The second portion 66 has a semi-cylindrical inner surface 73, an internally threaded first bolt aperture 74 at one end, and a spaced, smooth second bolt aperture 75 at the opposite end.

The rod aperture 71 is sized to receive the second end 37 of the rod 35 of the support portion 15. A bolt 77 extends through the second bolt aperture 75 of the second portion 66 and threads into the first aperture 69 of the first portion 65. Another bolt 77 extends through the second bolt aperture 70 of the first portion 65 and threads into the first aperture 75 of the second portion 66. The clamp 63 is assembled around a cylindrical structure, such as a tube on a wake board tower, and the bolts 77 are tightened to secure the pole mounting device 11.

Figure 11:
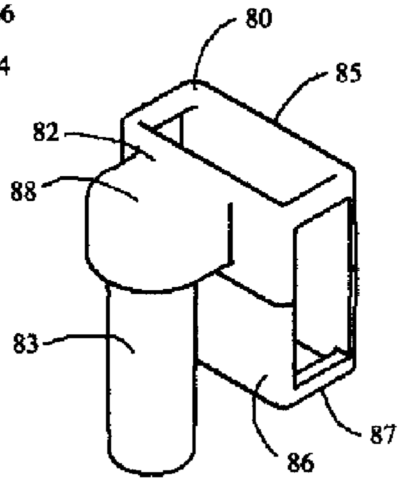
FIG. 11 is a perspective view of the adapter of FIG. 10.
Figure 10:
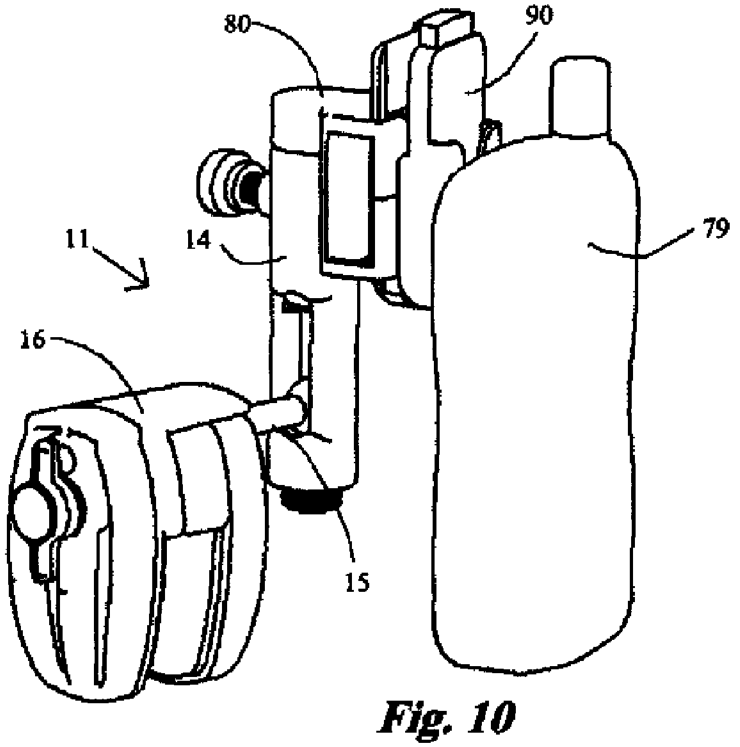
FIG. 10 is a perspective view of the mounting device of FIG. 1, with an adapter and an electronic device.

As shown in FIGS. 10 and 11, the pole mounting device 11 can be used to hold a mobile electronic device 79, such as a GPS, IPOD, or phone, or other articles. An adapter 80 includes a clip mount 82 and a post or pole 83. The clip mount 82 has a thin, rectangular front wall 85, a spaced, thin rectangular back wall 86, four struts 87 connecting the corners of the front wall 85 to the corners of the back wall 86, and a protrusion 88 that projects rearwardly from the back wall 86. The pole 83 projects downwardly from the protrusion 88, spaced from the back wall 86, and is sized to fit into the pole cavity 23 of the holder portion. A clip 90 on the device 79 clips over the front wall 85 to attach the device 79 to the adapter 80. When the device 79 is mounted on the pole mounting device 11, the holder portion 14 can be rotated about the first and second axes A1 and A2 to optimize the viewing angle for the device 79. By way of example, and not as a limitation, the pole mounting device 11 can be mounted on a dashboard or rail on a golf cart to hold a GPS to provide the distance to the hole for each shot.

Although the present invention has been described with a certain degree of particularity, it is understood that the present disclosure has been made by way of example and that changes in details of structure may be made without departing from the spirit thereof.

What is claimed is:

1. A mounting device for a pole comprising:

a holder portion having an open first end, a spaced, open second end, an interior surface and an exterior surface, said interior surface being shaped at said first end to define a pole cavity sized to receive an end of said pole, said interior surface of said holder portion being shaped to define a ball socket spaced in from said second end of said holder portion, a support portion having an elongated rod with a first end and a spaced second end, and a ball on said first end of said rod, said ball being sized to fit into said ball socket to form a ball joint with said ball socket with said rod extending transverse to said holder portion and said holder portion being rotatable relative to said rod about a first axis and about a second axis transverse to said first axis, and means, connected to said second end of said rod, for removably attaching said support portion to a structure, whereby said pole is positioned by rotation of said holder portion about said first and second axes.

2. The mounting device as set forth in claim 1 wherein said first axis is parallel to said rod.

3. The mounting device as set forth in claim 2 wherein said holder portion has a window extending from said ball socket to said exterior surface, said rod is sized to fit through said window, and said window is sized and positioned relative to said ball socket to limit rotation of said holder portion about said second axis to a selected range, whereby said holder portion is rotatable about said first axis through an unlimited range of rotation and rotatable about said second axis through said selected range of rotation.

4. The mounting device as set forth in claim 1 including means for adjusting the rotational resistance of said ball joint.

5. The mounting device as set forth in claim 4 wherein:

said interior surface is internally threaded between said second end of said holder portion and said ball socket, and said means for adjusting includes a set screw sized to thread into said second end of said holder portion, whereby said set screw bears against said ball and turning said set screw adjusts rotational resistance of said ball joint.

6. The mounting device as set forth in claim 1 wherein said means for removably attaching includes a vise clamp.

7. The mounting device as set forth in claim 6 wherein said clamp includes a pair of jaws, said jaws having spaced, opposed jaw surfaces and a resilient pad covering each said jaw surface, whereby said pads conform to contours to provide secure attachment of said clamp.

8. The mounting device as set forth in claim 6 wherein said vice clamp includes a first portion having a body slidingly mounted on said rod and an inwardly facing jaw that projects downwardly from said body, and a second portion having a body rigidly attached to said second end of said rod, and an inwardly facing jaw that projects downwardly from said body, whereby said first portion moves along said rod transverse to said holder portion to open and close said jaws.

9. The mounting device as set forth in claim 8 wherein said vice clamp includes a bolt, said first and second portions each include a rod aperture that extends through said body, and a spaced bolt aperture that extends through said body parallel to said rod aperture, said rod aperture of said first portion being sized to slidingly receive said rod, said rod aperture of said second portion being sized to rigidly attach to said second end of said rod, said bolt aperture of said first portion being internally threaded, said bolt aperture of said second portion being sized to slidingly receive said bolt, said bolt being sized to thread into said bolt aperture of said first portion, whereby rotating said bolt slides said first portion along said rod transverse to said holder portion to open and close said jaws.

10. The mounting device as set forth in claim 1 wherein said means for removably attaching includes a generally ring shaped clamp with opposed, complementary semi-circular first and second portions, said clamp being sized and shaped to fit around cylindrical structures of a selected diameter range.

11. The mounting device as set forth in claim 1 wherein:

said holder portion has a window extending from said exterior surface to said interior surface, said window extending from said ball socket towards said first end of said holder portion, said window having a selected height such that said second end of said rod can be inserted into said second end of said holder portion and out said window to assemble said ball into said ball socket.

12. The mounting device as set forth in claim 1 wherein said pole cavity is sized to receive an end of a flag pole, whereby said flag pole is raised and lowered by rotation of said holder portion about said first and second axes.

13. The mounting device as set forth in claim 1 including an adapter for mounting an article on said holder portion, said adapter having a clip mount for holding said article and a downwardly projecting pole attached to and spaced rearwardly from said clip mount, said pole being sized to fit into said pole cavity.

14. The mounting device as set forth in claim 13 wherein:

said clip mount includes a thin, rectangular front wall, a spaced, thin rectangular back wall, four struts connecting the corners of said front wall to the corners of said back wall, and a protrusion that projects rearwardly from said back wall, and said pole is spaced from said back wall and projects downwardly from said protrusion.

15. A mounting device for a pole comprising:

a holder portion having an open first end, a spaced, open second end, an interior surface and an exterior surface, said interior surface being shaped at said first end to define a pole cavity sized to receive an end of said pole, said interior surface of said holder portion being shaped to define a ball socket spaced in from said second end of said holder portion, said holder portion having a window extending from said ball socket to said exterior surface, a support portion having an elongated rod with a first end and a spaced second end, and a ball on said first end of said rod, said ball being sized to fit into said ball socket to form a ball joint with said ball socket with said rod being sized to fit through said window, extending transverse to said holder portion and said holder portion being rotatable relative to said rod about a first axis parallel to said rod and about a second axis transverse to said first axis, and means, connected to said second end of said rod, for removably attaching said support portion to a structure, wherein said window is sized and positioned relative to said ball socket to limit rotation of said holder portion about said second axis to a selected range, whereby said pole is raised and lowered by rotation of said holder portion about said first and second axes.

16. A mounting device for a pole comprising:

a holder portion having an open first end, a spaced, open second end, an interior surface and an exterior surface, said interior surface being shaped at said first end to define a pole cavity sized to receive an end of said pole, said interior surface being shaped to form a ball socket spaced from said second end and being internally threaded between said ball socket and said second end, a support portion having an elongated rod with a first end and a spaced second end, and a ball attached to said first end of said rod, said ball being sized to fit into said ball socket to form a ball joint with said ball socket with said rod extending transverse to said holder portion and said holder portion being rotatable relative to said rod about a first axis parallel to said rod and a second axis transverse to said first axis, a set screw sized to thread into said second end of said holder portion to adjust rotational resistance of said ball joint, and a vise clamp attached to said second end of said rod for removably attaching said rod to a structure, whereby said pole is positioned by rotation of said holder portion about said first and second axes.

* * * * *